W. A. SOMERS.
HANDLE LOCK FOR AUTOMOBILES.
APPLICATION FILED MAY 23, 1921.
1,424,686.
Patented Aug. 1, 1922.
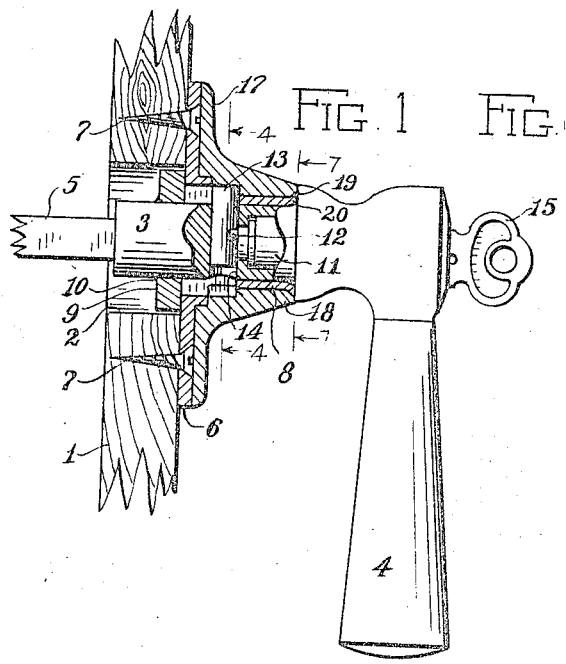
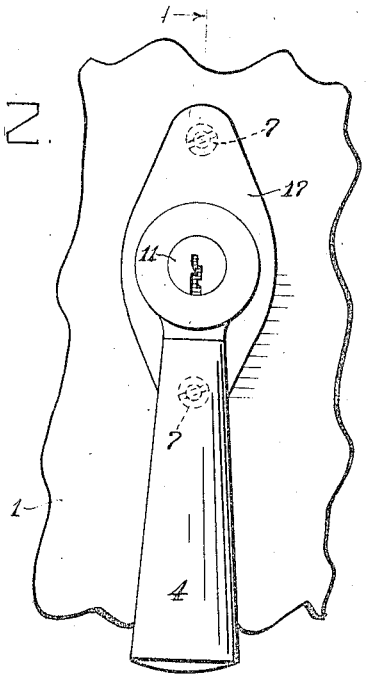
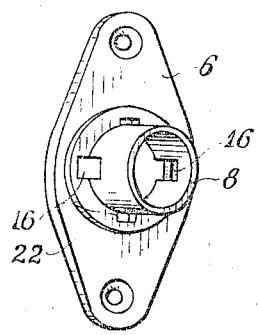
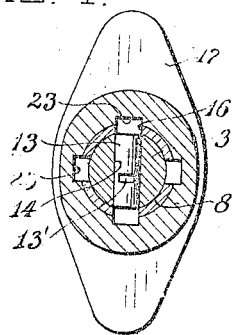
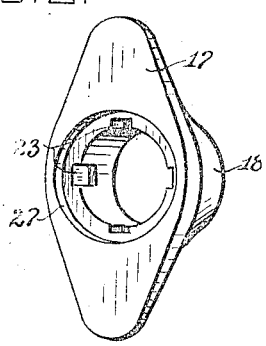
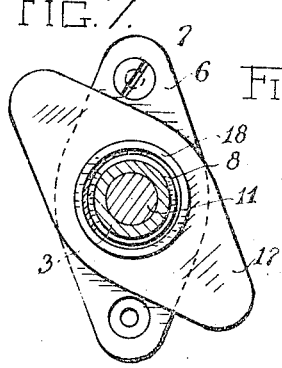
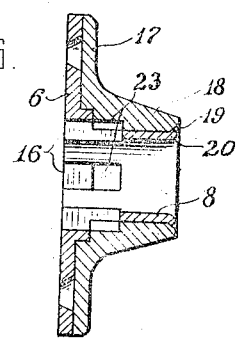
INVENTOR
William A. Somers
BY
ATTORNEY

UNITED STATES PATENT OFFICE.

WILLIAM A. SOMERS, OF MOUNT CARMEL, CONNECTICUT, ASSIGNOR TO THE MT. CARMEL MANUFACTURING COMPANY, OF MOUNT CARMEL, CONNECTICUT, A CORPORATION OF CONNECTICUT.

HANDLE LOCK FOR AUTOMOBILES.

1,424,686.  Specification of Letters Patent.  Patented Aug. 1, 1922.

Application filed May 23, 1921. Serial No. 471,572.

*To all whom it may concern:*

Be it known that I, WILLIAM A. SOMERS, a citizen of the United States, residing at Mount Carmel, county of New Haven, State of Connecticut, have invented an Improvement in Handle Locks for Automobiles, of which the following is a specification.

This invention relates to latch locks of the type employing an escutcheon plate to which the latch-spindle may be locked and a guard which, when said spindle is locked, will also be locked in a position to cover the escutcheon plate and prevent tampering with the means for securing the latter in position.

The invention has for an object to provide an improved locking device of the general character above referred to which will be simple in construction, containing few parts and wherein the guard is so mounted as to permit the same to be moved independently of the latch-handle and spindle in order to permit ready access to the escutcheon plate by authorized persons for the purpose of attaching or removing said plate.

It also has for an object to provide a device of this type in which the means employed for locking the latch-spindle against turning will also lock the guard in normal position to prevent access to the securing means for the escutcheon plate.

With the foregoing and other objects in view, I have devised the novel spindle lock which I will now describe, reference being had to the accompanying drawings, in which Fig. 1 is a vertical section of a portion of an automobile door and a locking device embodying the invention in place therein, the section being taken on the line 1—1 in Fig. 2. Fig. 2 is a front elevation of the device. Fig. 3 is a perspective view of the escutcheon plate. Fig. 4 is a section on the line 4—4 in Fig. 1. Fig. 5 is a perspective view of the guard. Fig. 6 is a vertical section through the escutcheon plate and guard removed from the spindle and Fig. 7 is a section on the line 7—7 in Fig. 1 showing the guard turned to allow access to the means for securing the escutcheon plate in position.

The automobile door 1 is provided with an opening 2 through which the shank 3 of the latch-handle 4 extends. The inner end of the shank is connected to the usual latch-spindle 5. An escutcheon plate 6 is secured to the outer face of the door by screws 7, said plate being provided with a sleeve or hub 8 in which the handle shank 3 is pivotally mounted. A collar 9 is secured on the shank 3 within the opening 2 in any suitable manner preferably by solder 10. This collar engages the inner face of the escutcheon plate 6 and holds the handle, shank and spindle against withdrawal. Within the forward end of the handle-shank is located the barrel 11 of a tumbler lock disposed preferably coaxially with the shank, said lock having an extension or pin 12 inserted in a groove 13' in a bolt 13 slidably mounted in a transverse opening 14 through the shank 3. This bolt 13 is preferably of a length slightly less than the diameter of the shank 3, so that it may be wholly retracted into this shank, the groove 13' being in one side of the bolt and adapted for turning and sliding engagement with the pin 12. The extension or pin 12 is placed eccentrically of the lock barrel so that on turning of the lock by the usual key 15 the bolt 13 is moved transversely of the shank, and when moved outwardly is adapted to engage one of a series of notches and openings 16 in the hub 8 of the escutcheon plate 6 and thereby lock the shank 3 against turning in the escutcheon plate.

The guard 17 is provided with a hub 18 rotatably mounted on the hub 8 of the escutcheon plate and is provided with a countersink 19 to allow the outer end of the hub 8 to be spun over as shown at 20 to frictionally hold the escutcheon plate and guard together so that they form a unit as shown in Fig. 6. The guard 17 is preferably substantially similar in form to the escutcheon plate 6 and when in normal position overlies the heads of screws 7, as shown in Figs. 1 and 2, thereby concealing said screws and preventing removal thereof. Access to said screws may, however, be obtained by authorized persons under certain conditions as hereinafter explained, by turning the guard on the hub 8 of the escutcheon plate. This can be accomplished without turning the handle 4 and latch-spindle 5, therefore making it unnecessary to hold the latch in released position during the removal or attachment of the escutcheon plate. Moreover as the guard is rotatably mounted on the hub 8, the handle 4 and with it the spindle 5 may be turned to operate the latch without moving the guard from normal position over the screws.

The hub 18 of the guard is provided with notches 23 which register with the openings 16 in the hub 8 of the escutcheon plate when the guard is in normal position over the screw 7. If now it is desired to lock the handle 4 and spindle 5 against turning movement in the escutcheon plate to prevent unlatching of the door 1, the key 15 is turned and with it the barrel 11 which will move the bolt 13 radially outward and the end thereof will pass through one of the openings 16 and into the recess 23 in the guard which is in register therewith. It will be obvious that then the shank 3 and with it handle 4 is locked against turning movement as is also the guard 17, both results being obtained by the movement of a single locking element.

When it is desired to either unlatch the door 1 or to expose the heads of screws 7, the bolt 13 is retracted into the shank 3 as shown in Fig. 4 by turning the key in the opposite direction as will be obvious. This action will unlock both the shank 3 and the guard 17.

It will thus be seen that I have devised a latch-lock which is simple in construction, reliable in operation and comprises a small number of parts, so is therefore not liable to get out of order and is easy and cheap to manufacture.

Having thus set forth the nature of my invention, what I claim herein is—

1. A locking device comprising a latch-spindle, an escutcheon plate, a guard for covering said escutcheon plate, said guard being movable relative to said escutcheon plate independently of said spindle, and means for locking said spindle to said escutcheon plate and for locking said guard in position thereover.

2. A locking device comprising a latch-handle having a shank, an escutcheon plate, a guard for covering said escutcheon plate, said guard being mounted on said plate and rotatable independently of the shank, and means for locking said shank to said escutcheon plate and for locking said guard against rotation on said plate.

3. A locking device comprising a latch-handle having a shank, an escutcheon plate having a notch, a guard for covering said escutcheon plate, said guard being rotatably mounted on said plate and having a notch adapted to register with the notch in the plate, and locking means for said shank and guard cooperating with the notches in said escutcheon plate and guard respectively.

4. A locking device comprising a latch-handle having a shank, an escutcheon plate having a hub in which said shank is rotatably mounted, said hub being provided with a notch, a guard rotatably mounted on said hub and having a notch adapted to register with the notch in said hub, and a transversely movable bolt carried by said shank and cooperating with said notches to lock said shank and guard to said escutcheon plate.

5. A locking device including a latch-spindle, an escutcheon plate in which said spindle is movably mounted, means for securing the escutcheon plate to a member to be latched, a guard for covering said securing means and movable with respect thereto independently of the spindle, and means for locking said spindle against movement and for locking said guard in position to cover said securing means.

6. A locking device including a latch-spindle, an escutcheon plate, means for securing the escutcheon plate to a support, a guard for covering said means, said spindle and guard being movable relative to said escutcheon plate and independently of each other, and means for locking said spindle to said escutcheon plate and for locking said guard in position to cover the securing means.

7. A locking device comprising an escutcheon plate provided with a hub, a latch-spindle movably mounted in said hub, a guard for covering said escutcheon plate mounted on said hub and movable independently of the latch-spindle, and means for locking the spindle and guard to said plate.

8. A locking device comprising an escutcheon plate, a latch-spindle movably mounted therein, means for securing the escutcheon plate to a support, a guard mounted on said plate and movable relative thereto independently of the spindle and adapted to cover said securing means, and means for locking the spindle and guard to said plate.

9. A locking device comprising an escutcheon plate provided with a hub having a notch or opening therein, a latch-spindle having a shank rotatably mounted in said hub, means for securing said escutcheon plate to a support, a guard for covering said means rotatably mounted on said hub and provided with a notch adapted to register with the notch or opening in the hub, and a movable bolt adapted to cooperate with the shank and said notches to lock the shank to the escutcheon plate and the guard in position to cover said securing means.

10. A locking device comprising an escutcheon plate having a hub, a latch-spindle having a shank rotatably mounted in said hub, means for securing the escutcheon plate to a support, a guard for said means rotatably mounted on said hub, and a bolt movable transversely of the shank and hub and cooperating therewith and the guard for locking the shank to the escutcheon plate and the guard in position to cover said securing means.

11. A locking device including a latch-spindle, an escutcheon plate in which said spindle is movably mounted, means for securing the escutcheon plate to a member to be latched, a guard for covering said securing means and movable with respect thereto independently of the spindle, and locking means adapted to engage the escutcheon and guard to prevent movement of the guard from the securing means.

In testimony wherof I affix my signature.

WILLIAM A. SOMERS.